(No Model.)

H. M. ASHLEY.
MANUFACTURE OF GLASS BOTTLES, &c.

No. 403,023. Patented May 7, 1889.

Witnesses.

Inventor,
Howard Matravers Ashley.

UNITED STATES PATENT OFFICE.

HOWARD MATRAVERS ASHLEY, OF FERRYBRIDGE, COUNTY OF YORK, ENGLAND.

MANUFACTURE OF GLASS BOTTLES, &c.

SPECIFICATION forming part of Letters Patent No. 403,023, dated May 7, 1889.

Original application filed September 26, 1887, Serial No. 250,767. Divided and this application filed November 10, 1888. Serial No. 290,506. (No specimens.) Patented in England March 7, 1887, No 3,434; in Austria-Hungary September 19, 1887; in Belgium September 23, 1887; in France September 24, 1887; in Canada January 3, 1888, No. 28,296; in Italy February 17, 1888; in Norway March 2, 1888; in Victoria April 18, 1888; in New South Wales April 20, 1888; in Tasmania April 21, 1888; in Spain July 13, 1888, and in Portugal August 3, 1888.

*To all whom it may concern:*

Be it known that I, HOWARD MATRAVERS ASHLEY, a subject of the Queen of Great Britain and Ireland, and a resident of Ferrybridge, in the county of York, England, have invented a new and useful Improvement in the Manufacture of Bottles and other like Hollow Glassware, (patented to me in Great Britain and Ireland by Letters Patent No. 3,434, dated March 7, 1887; in Austria-Hungary by Letters Patent dated September 19, 1887; in Belgium by Letters Patent dated September 23, 1887; in France by Letters Patent dated September 24, 1887; in Canada by Letters Patent No. 28,296, dated January 3, 1888; in Italy by Letters Patent dated February 17, 1888; in Victoria by Letters Patent dated April 18, 1888; in New South Wales by Letters Patent dated April 20, 1888; in Tasmania by Letters Patent dated April 21, 1888; in Norway by Letters Patent dated March 2, 1888; in Spain by Letters Patent dated July 13, 1888, and in Portugal by Letters Patent dated August 3, 1888,) of which the following is a specification.

This invention relates to means for making bottles and like hollow glassware by machinery, so as to dispense with the harmful process of glass-blowing by mouth, and also to reduce the cost of manufacture.

In another specification forming part of a division, Serial No. 290,507, filed November 10, 1888, of an application for United States Letters Patent filed September 26, 1887, Serial No. 250,767, of which this also is a division, I have described and claimed a certain apparatus or machinery for effecting the above-named object.

The present invention consists in a novel process primarily intended to be carried into effect by said machinery, but capable also of being worked by other apparatus, as hereinafter set forth and claimed.

A sheet of drawings accompanies this specification as part thereof.

Figure 1:
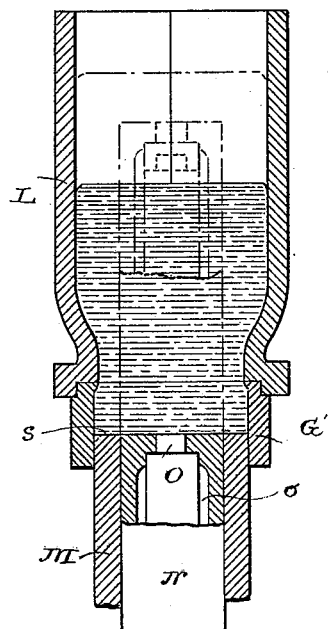
Figure 2:
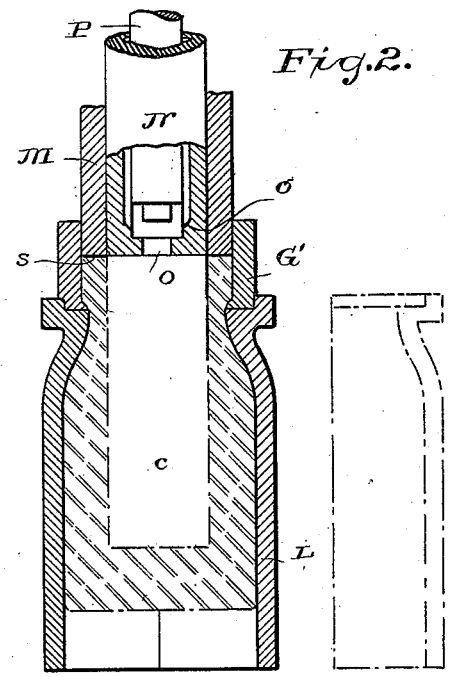
Figure 3:
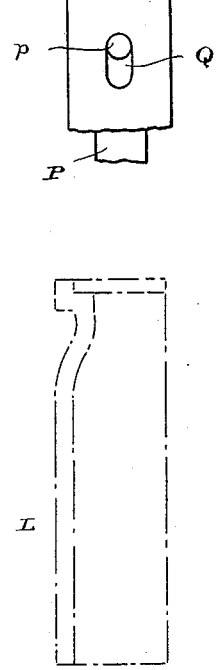
Figure 3:
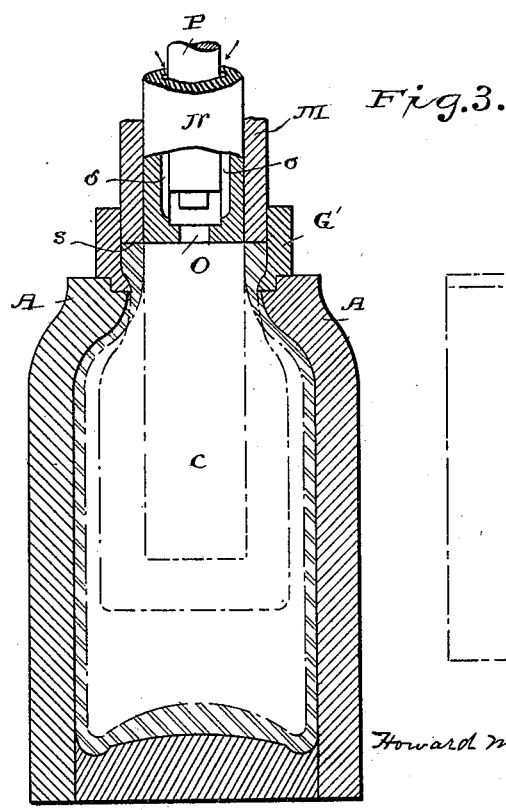

Figures 1 and 2 of these drawings represent sectional elevations of a "parison-mold," illustrating by full and dotted lines four positions of its parts. Fig. 3 is a sectional elevation of the same as shown in Fig. 2 with an ordinary longitudinally-divided bottle-mold fitted to the head mold or collar of the parison-mold for finishing the bottle.

Like letters of reference indicate corresponding parts in the several figures.

For clearness I have confined the drawings and will confine the following description to bottle-making, and have omitted in the drawings details of frame-work and actuating devices not necessary to an understanding of my said process by those skilled in the art.

The first part of my aforesaid process, as illustrated by Fig. 1, consists in measuring the molten glass, casting a parison in inverted position with a head that is finished as to external shape, and forming an initial recess or cavity therein by punching upwardly into the parison while it is inverted and the molten glass is unconfined, in contradistinction to forming the head of the bottle by pressing or by spinning operations. This is preferably effected in a parison-mold, Figs. 1 and 2, having a longitudinally-divided hollow body or mold proper, L, which is removable from the punched parison by separating its parts after the mold is reverted, as illustrated by Fig. 2, the parison to be expanded by the direct pressure of a gaseous fluid, as air, to form the body of the bottle within a distinct shaping-mold, as illustrated by Fig. 3. In the said parison-mold, Figs. 1 and 2, the parts of the body-mold L coact with a head-mold or collar, G, upon a tube, M, through which a hollow punch, N, works. This punch is made with a suitable opening, O, in its "face," which enters the mold, and an internal plug, P, is in the example fitted thereto. The stem of this plug extends longitudinally through the outer end of the punch, and serves as a means by which to force the punch forward into the glass within the mold to form the initial cavity c, and then to retract the punch. This movement is controlled by a stud-pin working in a slot, Q, in the punch N, and passages o in the punch connect the opening O with the interior of the tube M.

When the required quantity of molten glass is run into the inverted mold, thereby casting a parison in inverted position, the punch N is forced upwardly into the same, its outlet-opening O being kept closed by the plug P, and on being retracted the first movement of the plug admits a gaseous fluid, as air, steam, or gas under pressure, through the outlet-opening O into the cavity c, from which the punch is being withdrawn, so as to prevent a vacuum in the glass. The plug is shown at the end of its opening movement in dotted lines in Fig. 1.

In the act of casting the parison the head of the bottle is finished as to external shape without the aid of any pressing or spinning operation by means of a suitably-recessed head-mold or collar, G', and an annular surface, s, which is conveniently formed on the end of the tube M within the inner circumference of the collar. This surface shapes the outer face of the lip, and is readily given any required form by lathe turning or cutting it.

When the diameter of the neck of a bottle is to exceed the diameter of the head, a collar may be used made in one part; but for otherwise molding the head, as indicated in Figs. 1 and 2, a divided collar, such as is shown at G', is required, and such divided collar preferably embraces a suitable nozzle, which is formed, for example, by the end of said tube M and provided with said surface s.

The parts of the body-mold L and those of the divided collar G' may be carried into and out of position by any approved means. Suitable slides for the purpose are shown at U and at H H² in the drawings forming part of another companion case, Serial No. 290,508, filed November 10, 1888.

The diameter of the punch N is made suitable for the mouth of the bottle, and the glass cut out by the punch is carried bodily forward and left in the hotter part of the mass, where it soon recovers from the chilling contact of the punch and head-mold, while the mouth itself is sufficiently chilled to cause it to preserve the diameter so given to it. Bottles thus made are perfectly uniform as to size of mouth and shape of head or lip, which is frequently a great desideratum.

When the parison is completed, the parison-mold is reversed, and its body-mold L is then opened, as illustrated by Fig. 2.

The parison, suspended by the collar G', is allowed to elongate by gravity, aided preferably by a slight pressure of the said gaseous fluid entering it through the punch. As it elongates, the bottom of the parison is caught on a "paddle" in the hand of the operator, or anything which will regulate its elongation and slightly chill or stiffen the extremity of the parison, which would otherwise be hotter and be blown thinner than the immediately adjoining side portions, while the shoulders of the bottle might suffer from excessive elongation of the parison before the blowing operation. The exterior of the parison becomes slightly chilled in the parison-mold, and if the latter is of the proper internal shape and dimensions and the proper thickness of walls for bottles of a given pattern and weight the hollow body portion of the parison is ready to be blown, as regards the consistency or condition of the glass, as soon as it is sufficiently elongated. The parison, still suspended by the collar G', is now inclosed in a bottle-mold, A, Fig. 3, of any approved shape and construction, simply fitted to the collar in the same manner, for example, as the body-mold L. The neck end of the mold is closed by the head of the parison and the collar G' encircling the same. The gaseous fluid is now admitted through the punch N into the cavity c of the parison, so as to blow the same into a finished bottle within the mold A. Alternatively the air may be exhausted from the space around the parison in the bottle-mold, as set forth in another companion case. Finally, the bottle-mold A and the collar G' are opened, and the released bottle is removed to the annealing-oven, as is customary. The collar and punch are then inverted again, and the parison-body-mold L is closed upon the collar, ready to receive another charge of molten glass, as in Fig. 1. Suitable means for simultaneously inverting and reverting the parts of the parison-mold are set forth in said companion case, Serial No. 290,508, which also sets forth suitable means for preserving a connection between the interior of the punch and an air-pump or other apparatus supplying a gaseous fluid under pressure, or for connecting the exterior of the mold with suitable exhausting apparatus.

The molten glass should be poured into the parison-mold in a condition intermediate between "founding" heat and the heat necessary for gathering at one operation for glass-blowing by mouth. Preferably the glass is used at the maximum for blow-pipe work, but it can be used at higher temperatures for some kinds of bottles.

In order that the molten glass, when required for use, may be of equal temperature throughout, I preferably scoop up a sufficient quantity of glass from the tank with a crucible or like vessel, of plumbago or other material that is a slow conductor of heat, and which has been previously heated to the temperature of the glass, so as to prevent chilling the same. After the externally-adhering glass has drained back into the tank, the vessel is taken from the furnace and the molten glass is poured therefrom into the molds, as required. While the vessel is so draining, the glass within it recovers from any disturbance or variation of its temperature and fluidity due to removing it from the tank, and uniformity of thickness in the molded article is thus insured.

The body portion of a parison for a given bottle, as formed by casting and punching according to this process, is substantially similar to one formed by a skilled glassblower by gathering, marvering, and blowing, except that it is advantageously made somewhat thicker at its shoulders. The parison-mold is constructed accordingly as to internal shape and dimensions. As to relative thickness, it should be somewhat less than one-half as thick as a bottle-mold of like material—say three-sevenths the thickness of the latter.

At any part of the mold where the glass would be likely to cool too rapidly from any cause I arrange that the flames from one or more gas-burners shall impinge upon such part, so as to retain it at the required temperature.

Details of construction and procedure which have not been specified may be of any approved description.

I do not claim herein the above-described apparatus or machinery for carrying this process into effect, nor any part thereof, nor the above-described process of handling the molten glass preparatory to the parison-casting operation, nor the process of expanding the parison within a shaping-mold by atmospheric pressure within the parison by exhausting the air from around said mold. These inventions are claimed in said original application, and the divisions thereof which are serially numbered 290,505, 290,507, 290,508, and 290,510, filed November 10, 1888. Neither do I limit my claims, hereinafter stated, to bottle-making, to which the drawings and description have been confined for greater clearness, as aforesaid, nor to details of procedure not essential to the present process.

Having thus described this process and suitable means for carrying the same into effect, I claim as my invention and desire to patent under this specification—

1. In the manufacture of hollow glassware, the within-described process of making a hollow parison, which consists of measuring the molten glass and casting a solid parison in inverted position with a head that is finished as to external shape, forming a recess or cavity therein by punching upwardly into the parison while it is inverted, and thus carrying the chilled glass which is cut from within the head into the hotter portion of the mass, for the purposes set forth.

2. In the manufacture of hollow glassware, the within-described process of making a hollow parison, which consists of casting the parison in inverted position, punching upwardly thereinto, and then retracting the punch while simultaneously admitting a gaseous fluid into the cavity to prevent the collapsing of the parison, substantially as hereinbefore specified.

3. In the manufacture of hollow glassware, the within-described process, which consists of casting a parison in inverted position, forming the cavity therein by punching upwardly into the parison while it is inverted, and subsequently expanding the parison by gaseous pressure, substantially as hereinbefore specified.

4. In the manufacture of hollow glassware, the within-described process, which consists of casting a parison in inverted position, forming the cavity therein by punching upwardly into the parison while it is inverted, reverting the parison, and subsequently expanding it by gaseous pressure, substantially as hereinbefore specified.

5. In the manufacture of hollow glassware, the within-described process, which consists of casting a parison in inverted position, forming the cavity therein by punching upwardly into the parison while it is inverted, reverting the parison, and subsequently substituting a shaping-mold for the parison-mold and expanding the parison within the shaping-mold by gaseous pressure, substantially as hereinbefore specified.

6. In the manufacture of hollow glassware, the within-described process, which consists of casting a parison in inverted position, forming the cavity therein by punching upwardly into the parison while the latter is inverted, withdrawing the punch from within the parison, and subsequently expanding the parison by introducing a gaseous fluid into the cavity, substantially as hereinbefore specified.

7. In the manufacture of hollow glassware, the within-described process, which consists of casting a parison in inverted position with a head that is finished as to external shape, forming an initial recess or cavity therein by punching upwardly into the parison while it is inverted, then reverting the same and suspending the body portion by the head, and expanding the depending body portion within a shaping-mold by the direct pressure of a gaseous fluid, as air, substantially as hereinbefore specified.

8. In the manufacture of hollow glassware, the within-described process, which consists of casting a parison in inverted position with a head that is finished as to external shape, forming an initial recess or cavity therein while it is inverted, then reverting the parison and suspending the body portion by the head, and expanding the depending body portion by pressure of a gaseous fluid, as air, substantially as hereinbefore specified.

9. The within-described process of manufacturing hollow glassware, which consists of measuring the glass and casting a solid parison in inverted position with a head that is finished as to external shape, including the face of the lip, completing the mouth, and forming an initial recess or cavity in the body portion by punching upwardly into the parison while it is inverted, reverting the parison, and expanding the body portion thereof by pressure of a gaseous fluid, as air, substantially as hereinbefore specified.

10. The within-described process of manufacturing hollow glassware, which consists of measuring the glass and simultaneously casting a solid parison in inverted position with a head that is finished as to external shape, including the face of the lip, completing the mouth, and forming an initial recess or cavity in the body portion by punching upwardly into the parison while it is inverted, immediately retracting the punch, reverting the parison, and suspending it by its head for elongation, regulating its elongation, and slightly chilling its extremity by paddling, and finally confining the depending portion of the parison within a suitable shaping-mold and blowing it by the internal pressure of a suitable gaseous fluid, as air, substantially as hereinbefore specified.

HOWARD MATRAVERS ASHLEY.

Witnesses:
FRANCIS FORBES,
JAS. L. EWIN.